United States Patent [19]
Weber

[11] Patent Number: 4,650,732
[45] Date of Patent: Mar. 17, 1987

[54] SELF-COMPENSATING HEATING SYSTEM FOR A RESERVE ELECTROLYTE BATTERY

[75] Inventor: Kent Weber, Rockford, Ill.

[73] Assignee: Sundstrand Corporation, Rockford, Ill.

[21] Appl. No.: 536,678

[22] Filed: Sep. 28, 1983

[51] Int. Cl.$^4$ .................... H01M 10/50; B60H 1/00
[52] U.S. Cl. ................................. 429/120; 429/118; 165/32; 165/40
[58] Field of Search ............... 429/120, 118; 165/32, 165/40; 122/5, 32

[56] References Cited

U.S. PATENT DOCUMENTS

| | | | |
|---|---|---|---|
| 2,231,764 | 2/1941 | Laing | 165/32 |
| 3,238,070 | 3/1966 | Porter | 429/120 X |
| 3,419,435 | 12/1968 | Recht et al. | 429/120 X |
| 3,534,812 | 10/1970 | Sandri | 122/32 |
| 3,537,510 | 11/1970 | Rannenburg et al. | 165/32 |
| 3,959,019 | 5/1976 | Miyoshi et al. | 136/86 |
| 4,156,455 | 5/1979 | Van der Meulen | 165/32 |
| 4,180,623 | 12/1979 | Adams | 429/21 |

OTHER PUBLICATIONS

Drawing No. 9391719 of Hi-Shear Corporation in existence prior to Sep. 28, 1982.

Primary Examiner—Brian E. Hearn
Assistant Examiner—Stephen J. Kalafut
Attorney, Agent, or Firm—Wood, Dalton, Phillips, Mason & Rowe

[57] ABSTRACT

A self-compensating heating system for a reserve electrolyte battery which may be stored at widely varying temperatures and which has a storage tank for electrolyte to be supplied to the battery, a heat exchanger in a flow path from the storage tank to the battery, a laminar flow device which is viscosity-sensitive to control the rate of electrolyte flow to the battery, and a solid propellant gas generator which delivers a hot gas to the heat exchanger and with the hot gas flowing to the storage tank to operate on a pressure-responsive device for expelling electrolyte from the storage tank.

5 Claims, 1 Drawing Figure

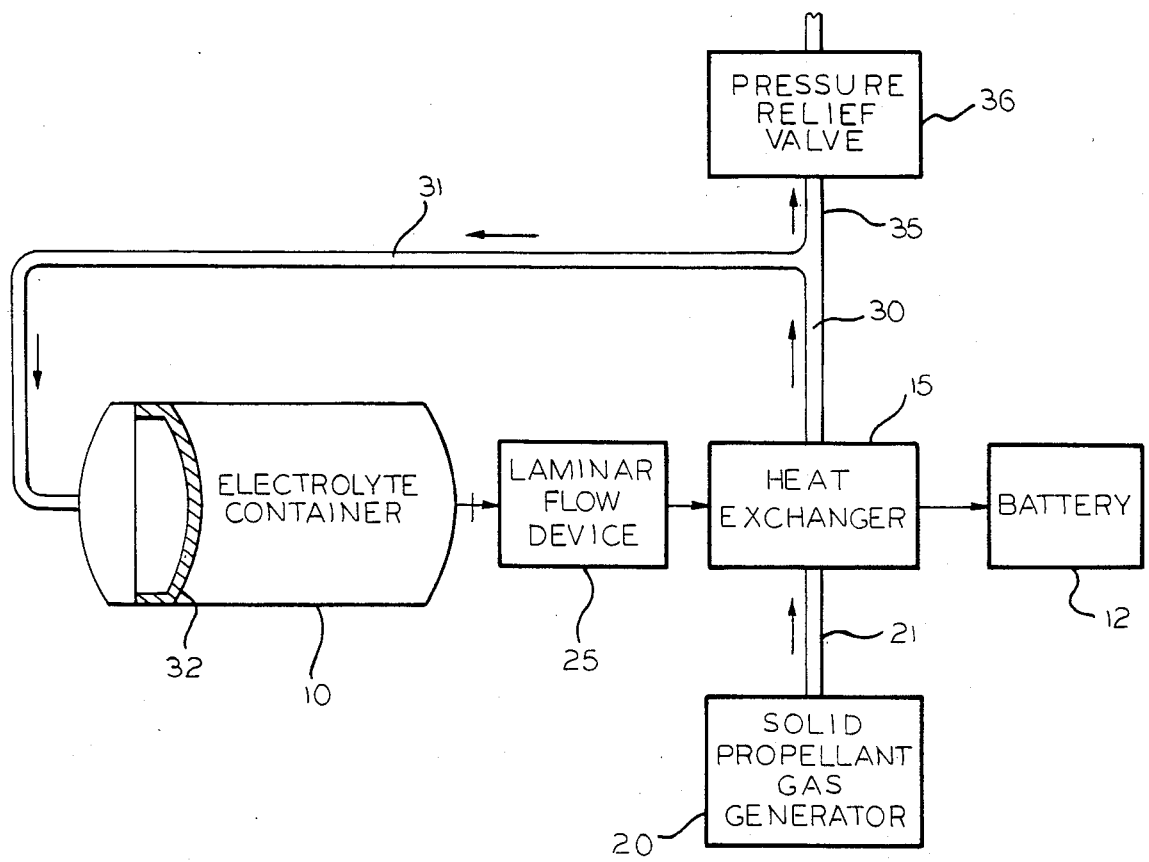

4,650,732

SELF-COMPENSATING HEATING SYSTEM FOR A RESERVE ELECTROLYTE BATTERY

DESCRIPTION

1. Technical Field

This invention pertains to a self-compensating heating system for a liquid and, more particularly, to such a system for heating stored electrolyte liquid prior to delivery to a battery by heat exchange with hot gas derived from a solid propellant gas generator. The system has particular utility wherein both the liquid, such as an electrolyte, and the solid propellant are components of a missile or torpedo or the like and have been stored at ambient temperature for a period of time. When the battery is to be activated, the solid propellant gas generator is placed in operation and the electrolyte is heated to an approximate desired temperature through control of the flow rate of the electrolyte and the burn rate of the solid propellant.

2. Background Art

A reserve electrolyte battery is often stored at temperatures below the optimum temperature range for battery operation. When the battery is used in connection with a missile control system, it will be obvious that the temperature at which the battery and electrolyte are stored can vary widely. Another example is an air launched torpedo where the storage temperature of the battery and electrolyte used in the torpedo control can vary. The reserve electrolyte battery is stored dry with no electrolyte in it and, when electrolyte is delivered, the battery provides high power for a short time. The absence of electrolyte within the battery prolongs the storage life of the battery.

It has been known to heat the electrolyte before delivery to the battery or to heat a battery during the operating cycle of the battery. Included has been the use of a chemical energy source, such as a solid propellant gas generator, which burns a solid propellant fuel to provide heat to the heat exchanger through which the electrolyte flows as it leaves a storage tank and enters the battery. The electrolyte in the storage tank has been pumped or expelled from the storage tank by the use of a solid propellant gas generator or a compressed gas storage bottle which acts on a pressure-responsive member within the storage tank.

If the storage temperature range is wide and the allowable operating temperature band for the electrolyte is narrow, a plurality of heater segments and temperature switches may be required to achieve the desired operating temperature. Such a system can be complicated and expensive.

DISCLOSURE OF THE INVENTION

A primary feature of the invention is to provide a self-compensating heating system for a liquid, such as an electrolyte for a reserve electrolyte battery, that controls the flow rate of liquid through a heat exchanger dependent upon the viscosity of the liquid which varies with the storage temperature of the liquid and with the heat exchanger being connected to a source of hot gas for heat exchange with the liquid as it flows through the heat exchanger. With the use of a solid propellant gas generator as a source of hot gas, the burn rate thereof is subject to change, dependent upon the storage temperature of the solid propellant whereby the heat input to the fluid, such as an electrolyte, is subject to inherent regulation during the activation cycle when the electrolyte is supplied to the battery.

Another feature of the invention is to provide a self-compensating heating system for electrolyte for a battery wherein the electrolyte and a solid propellant gas generator may be stored for a period of time at widely varying temperatures wherein the system has a heat exchanger in a flow path for the electrolyte from a storage tank to the battery, viscosity-sensitive means for controlling the flow rate of electrolyte through the heat exchanger, and means for flowing hot gas derived from burning of the solid propellant through the heat exchanger in heat exchange relation with the electrolyte.

An object of the invention is to provide a self-compensating heating system for heating a liquid to an approximate desired temperature comprising, a heat exchanger, means for flowing the liquid through said heat exchanger at a variable rate dependent upon the temperature of the liquid entering the heat exchanger, and means for separately flowing a hot fluid through the heat exchanger in heat exchange relation with said liquid.

Still another object of the invention is to provide a self-compensating heating system for a reserve electrolyte battery wherein the battery as well as a storage tank for electrolyte and a solid propellant gas generator are subject to storage at widely varying temperatures comprising means defining a flow path from the storage tank to the battery including a laminar flow device to control the rate of electrolyte flow dependent on the viscosity thereof, a heat exchanger in the flow path downstream of the laminar flow device and the solid propellant gas generator having a gas outlet connected to said heat exchanger whereby hot gas from the generator flows through the heat exchanger for heat exchange with the electrolyte.

An additional object of the invention is to provide a self-compensating heating system as defined in the preceding paragraphs wherein the hot gas, after flow through the heat exchanger, flows to the storage tank and operates upon a pressure-responsive member therein to cause electrolyte to flow in said flow path.

Still another object of the invention is to provide a method of heating a stored electrolyte to an approximate desired temperature prior to delivery to a battery comprising, flowing the electrolyte through a heat exchanger at a rate which varies dependent upon the temperature of the stored electrolyte, and flowing a hot gas through the heat exchanger in heat exchange relation with the electrolyte and with the rate of gas flow varying with the temperature of the stored electrolyte.

BRIEF DESCRIPTION OF THE DRAWINGS

The FIGURE is a schematic of the self-compensating heating system for a reserve electrolyte battery.

BEST MODE FOR CARRYING OUT THE INVENTION

The self-compensating heating system, as shown in the FIGURE, is for the heating of a liquid and, particularly, an electrolyte stored in a container, such as a storage tank 10, prior to use in a reserve electrolyte battery 12. The reserve electrolyte battery 12 may be subject to storage for an indefinite period of time and, therefore, is stored dry to prolong the storage life. Examples of uses of the battery are missile and torpedo control systems wherein the battery must reliably operate over a relatively short period of time to provide a high power output.

The electrolyte is a liquid, such as an acid, and has a viscosity-temperature relationship whereby the viscosity of the liquid increases with a decrease in temperature. There is a desired approximate temperature for the electrolyte as used in the battery and the storage tank 10 and battery 12 may have been in a device, such as a missile, that has been stored for a long time at a temperature below the approximate desired temperature.

The self-compensating heating system provides for transfer of heat to the electrolyte flowing to the battery by utilization of a heat exchanger 15 in the electrolyte flow path between the storage tank 10 and the battery 12. This heat exchanger can be a conventional shell and tube heat exchanger, with the electrolyte flowing through the tubes thereof.

A source of heat is provided by a solid propellant gas generator 20 having an outlet connected to the shell of the heat exchanger 15 by a conduit 21. The solid propellant gas generator is a well known device used to provide a hot gas for use in a heat exchanger or other uses, such as driving a turbine. The solid propellant, as an example, can be a solid ammoniumnitrate mixture which burns at a controlled rate. It is inherent that the burn rate of the solid propellant varies as a function of the temperature at which the solid propellant has been stored. The solid propellant burns rapidly after storage at high temperature and more slowly after storage at low temperature.

The flow rate of electrolyte from the storage tank 10 to the battery 12 is made dependent upon the viscosity of the electrolyte and, therefore, dependent upon the temperature at which the electrolyte has been stored. This dependency upon electrolyte viscosity is provided by use of a laminar flow device 25 in the flow path of the electrolyte. This laminar flow device can be a series of capillary tubes through which the electrolyte flows. An alternate construction of the laminar flow device would be a group of closely-stacked plates between which the electrolyte flows and which provide a capillary tube function. The fluid flow impedance of the laminar flow device 25 is very viscosity-sensitive, offering a high impedance at high fluid viscosity resulting from a low storage temperature for the electrolyte and a low impedance at low fluid viscosity when the electrolyte has been stored at a relatively high temperature. The laminar flow device 25 could be integrated with the heat exchanger 15. Thus, the burn rate of the solid propellant and the flow rate of the electrolyte vary dependent upon the temperature at which the solid propellant and the electrolyte have been stored and, thus, effectively vary with the storage temperature of the electrolyte, since both have been stored at the same location.

When the electrolyte and solid propellant have been stored at a relatively low temperature, the burn rate of the solid propellant is low, whereby the generator burns for a relatively long time and delivers hot gas at a lower rate. The high fluid flow impedance created by the laminar flow device 25 causes the electrolyte to flow slowly from the storage tank 10. At this low flow rate, the electrolyte flows through the heat exchanger for a relatively long time, which takes into account the slower delivery of hot gas from the solid propellant gas generator 20. This results in a longer time in which an increment of electrolyte is in the heat exchanger and heats the electrolyte, even though at a relatively low heat transfer rate. After storage at high temperature, the solid propellant burns faster and for a shorter period. The fluid impedance of the electrolyte is low after correspondingly high temperature storage thereof and, although the heat transfer rate in the heat exchanger 15 is higher, due to the higher flow rates of both the hot gas and the electrolyte, the fluid temperature rise is less, due to the shorter time that any increment of the electrolyte is in the heat exchanger. Thus, after high temperature storage, less heat is added to the electrolyte than occurs after cold storage. This tends to automatically narrow the operating temperature band and does so without the complication of multiple temperature sensors and heat sources.

The hot gases flow from the heat exchanger 15 through a conduit 30 which connects to a conduit 31 leading to the storage tank 10. The storage tank 10 has a pressure-responsive member 32, such as a piston, a bellows, or a collapsing bladder, which responds to a pressure build-up within an end of the storage tank and operates to expel electrolyte from the storage tank. A branch conduit 35 has a pressure relief valve 36 which operates to vent excess hot gas to avoid over-pressurization within the storage tank 10. Alternative to the use of the pressure relief valve 36, the solid propellant could be tailored to assure that there would be no over-pressurization of the storage tank 10. The solid propellant burns from end to end and the gas evolution rate and pressure created are related to the cross-sectional area of the solid propellant whereby the burn rate can be effected by tailoring of the charge as by having it tapered.

As is known in the art, means (not shown) are provided for initiating burning of the solid propellant when the battery is to be activated and the outlet of the storage container 10 can have a closure for retaining the electrolyte therein which will be fractured when hot gas pressurizes the pressure-responsive member 32 to initiate flow of electrolyte, with an example of such closure being a burst disc.

The volume of electrolyte required for the battery can vary widely, with the battery as used in certain missiles requiring one pint of electrolyte, while a battery as used in an air launched torpedo would require several quarts of electrolyte. The components through which the electrolyte flows are sized to provide for the necessary flow of electrolyte to the battery within a very short period of time in the range of a few seconds. In one example, the total electrolyte flow time when the components have been stored on a hot day might be two seconds, while the flow time on a cold day would be three seconds.

From the foregoing, it will be seen that a self-compensating heating system has been provided for a liquid, such as an electrolyte wherein the heat exchange rate between a hot gas and the liquid is dependent upon the temperature at which the liquid has been stored and, more particularly, with the flow rate through a heat exchanger being dependent upon the viscosity of the stored liquid. The self-compensation further takes into account the varying burn rate of the solid propellant, dependent upon the temperature at which it has been stored, whereby there is a greater heat transfer to the electrolyte when storage has been at a cold temperature as compared to storage at a warmer temperature.

It will be evident that there has been disclosed a method of heating a stored electrolyte to an approximate desired temperature prior to use in a battery comprising, flowing the electrolyte through a heat exchanger 15 at a rate which varies dependent upon the temperature of the stored electrolyte because of the flow through the laminar flow device 25 which is viscosity-sensitive, and flowing a hot gas through the heat exchanger 15 in heat exchange relation with the electrolyte. The rate of gas flow varies with the temperature of the stored electrolyte because of the solid propellant also burning at a varying rate, depending upon the storage temperature thereof, which is the same as that of the stored electrolyte.

I claim:

1. A self-compensating heating system for a reserve electrolyte battery comprising, a storage tank for electrolyte to be supplied to the battery, means defining a flow path from the storage tank to the battery including a laminar flow device having flow passages sufficiently small to establish viscosity-sensitive flow impedance to assure that the rate of electrolyte flow is dependent on the viscosity of the electrolyte and a heat exchanger downstream of the laminar flow device, and a solid propellant gas generator having a gas outlet connected to said heat exchanger for burning a solid propellant with a burn rate which increases with the temperature at which the solid propellant is stored whereby there is a relation between the electrolyte flow and heat generated to have longer exposure of the electrolyte to gas in the heat exchanger when the battery is stored at low temperature.

2. A self-compensating heating system as defined in claim 1 wherein said storage tank has a pressure-responsive device for expelling electrolyte therefrom, and means for directing gas from the heat exchanger to the storage tank to act on said pressure-responsive device.

3. A self-compensating heating system as defined in claim 1 wherein said propellant gas generator has a tailored propellant charge for a controlled burn rate.

4. A self-compensating heating system as defined in claim 3 wherein said electrolyte is stored in a storage tank having a pressure-responsive member for expelling electrolyte therefrom, and means connecting the heat exchanger to said storage tank to have hot gas exert pressure on said pressure-responsive member.

5. A self-compensating heating system as defined in claim 4 including a pressure relief valve in the connecting means between the heat exchanger and the storage tank.

* * * * *